United States Patent [19]
Duvdevani et al.

[11] Patent Number: 4,701,204
[45] Date of Patent: Oct. 20, 1987

[54] COMPOSITE COMPRISING A SUBSTRATE COATED WITH POLYMERIC COMPLEXES

[75] Inventors: Ilan Duvdevani, Leonia; Pacifico V. Manalastas, Edison; Evelyn N. Drake, Lebanon; Warren A. Thaler, Flemington, all of N.J.

[73] Assignee: Exxon Research and Engineering Company, Florham Park, N.J.

[21] Appl. No.: 808,034

[22] Filed: Dec. 12, 1985

[51] Int. Cl.$^4$ .......................... C05C 9/00; B32B 5/16; B32B 27/06
[52] U.S. Cl. ........................................ 71/28; 428/334; 428/407; 428/517; 428/461; 427/212; 427/221; 427/385.5; 71/1; 71/64.07; 525/344
[58] Field of Search ............... 428/334, 407, 517, 461; 427/213, 221, 385.5, 212; 71/1, 28, 64.07

[56] References Cited
U.S. PATENT DOCUMENTS

| | | | |
|---|---|---|---|
| 4,455,344 | 6/1984 | Matsuyama et al. | 428/407 X |
| 4,500,336 | 2/1985 | Van Hijfte et al. | 427/213 X |
| 4,508,761 | 4/1985 | Miyoshi et al. | 427/221 |
| 4,517,250 | 5/1985 | Agarwal et al. | 428/517 X |
| 4,568,559 | 2/1986 | Nuwayser et al. | 427/213 X |

Primary Examiner—P. C. Ives
Attorney, Agent, or Firm—Richard E. Nanfeldt

[57] ABSTRACT

A composite comprising a substrate and an elastomeric coating adhered to at least one surface of said substrate, said elastomeric coating having a thickness of about 1 to about 100 micrometers, wherein said elastomeric coating comprises an interpolymeric complex of a neutralized sulfonated polymer and an amine containing polymer, said neutralized sulfonated polymer having a sulfonate content of about 4 to about 200 meq. per 100 grams of said neutralized sulfonated polymer and said amine containing polymer containing basic nitrogen atoms wherein the basic nitrogen content ranges from about 4 to about 500 meq. per 100 grams of polymer.

12 Claims, No Drawings

COMPOSITE COMPRISING A SUBSTRATE COATED WITH POLYMERIC COMPLEXES

FIELD OF THE INVENTION

The present invention relates to elastomeric coatings having improved barrier properties wherein the elastomeric coating is formed from an organic solution of an interpolymer complex of an anionic polymer and a cationic polymer.

DESCRIPTION OF PRIOR ART

In recent years, interpolymer complexes have received considerable attention in the literature due to their interesting and unique properties and their similarity to certain biological systems. In most instances, these complexes are formed by intimately mixing aqueous solutions containing high-charge density polyelectrolytes possessing opposite charge. When these polymer molecules meet in solution, the interaction between oppositely charged sites will cause the release of their associated counterions, forming the complex. The counterions are now free to diffuse into the bulk solution. Normally, phase separation occurs upon prolonged standing. These high-charge density complexes are not readily formed in organic solvents due to the insolubility of the individual components. Therefore, little work has detailed the solution properties of these systems. To the inventors' knowledge, few studies have focused on the viscosification aspects of high or low-charge density complexes in organic diluents. In these studies, viscosity is used only as a tool to study the development and mechanism of complex formation.

There are many applications for thickened or gelled solutions of polymers in organic liquids which are quite diverse. There are also a number of physical and chemical techniques for preparing such systems. The present invention is concerned with a process for forming an elastomeric coating having improved barrier properties.

Coatings which can be protective, decorative or special purpose are usually applied at thicknesses of as high as 50 micrometers or thicker in order to provide the desired properties required of such coatings. Higher thicknesses are required in order to compensate for coating defects or for poor coating material properties.

Coatings with improved properties may be applied as thin films having a thickness range of 1–100 micrometers, with a preferred range of 2–20 micrometers, with a preferred range of 2–20 micrometers. In order for such coatings to be functional, they have to meet one or more of the following criteria: the coating material should show improved barrier properties; the applied thin coating should be a continuous film with few or no defects; and there should be a proper adhesion between the coated material and coating.

The material used in the thin film coating should have an optimized balance of properties, such as elasticity, toughness, hardness, abrasion resistance, etc., for durability under adverse conditions. For special coatings, surface properties, such as surface tension or tribological properties, may need to be met.

The instant invention teaches that a solution of an inter-polymer complex of an anionic polymer and a cationic polymer where at least one of the two polymers is elastomeric can meet many of the requirements for an improved thin film coating.

SUMMARY OF THE INVENTION

The present invention relates to a process for forming an elastomeric coating having improved barrier properties from an organic solution of an organic liquid and an interpolymer complex of a cationic polymer and an anionic polymer.

GENERAL DESCRIPTION

The present invention relates to a process for forming an elastomeric coating having improved barrier properties from an organic solution of an organic liquid and an interpolymer complex of a cationic polymer and an anionic polymer.

The component materials of the instant process generally include a water insoluble interpolymer complex dissolved in an organic solvent system to form a solution with a concentration level of 0.1 to 20 weight percent. The solvent system comprises an organic solvent with or without a polar cosolvent, such as alcohol or amine. The solvent can be an organic liquid which is capable of dissolving the polymeric backbone. A cosolvent may be needed to break up associated domains resulting from aggregation of ionic species.

In general, the interpolymer complex is formed from the interaction in solution of a water insoluble anionic, sulfonated polymer and a cationic copolymer, such as styrene/vinyl pyridine copolymer. The water insoluble anionic sulfonated polymer will comprise from about 4 to about 200 milliequivalents of pendant sulfonate groups per 100 grams of polymer, more preferably from 10 to 100 meq. pendant sulfonate groups. In most instances, the sulfonates utilized in the instant invention are acids or are neutralized with transition elements selected from Groups IVA, VA, VIA, VIIA, VIIIA, IB and IIB of the Periodic Table of Elements and lead, tin and antimony, as well as ammonium and amine counterions. Sulfonated polymers which are subject to the process of the instant invention are illimitable and include both plastic and elastic polymers. Specific polymers include sulfonated polystyrene, sulfonated t-butyl styrene, sulfonated ethylene copolymers, sulfonated atactic propylene polymers and propylene copolymers, sulfonated styrene/acrylonitrile copolymers, sulfonated styrene/methyl methacrylate copolymers, sulfonated block copolymers of styrene/ethylene oxide, acrylic acid copolymers with styrene, sulfonated polyisobutylene, sulfonated ethylene-propylene terpolymers, sulfonated polyisoprene copolymers (Butyl rubber), and sulfonated elastomers and their copolymers. The preferred sulfonated polymers of the instant invention are ethylene-propylene terpolymers Butyl rubber and polystyrene, wherein the ethylene-propylene terpolymers and polystyrene are most preferred.

Neutralization of the cited polymers with appropriate metal hydroxides, metal acetates, metal oxides, or ammonium hydroxide, etc. can be conducted by means well known in the art. For example, the sulfonation process as with Butyl rubber, containing a small 0.3 to 1.0 mole percent unsaturation, can be conducted in a suitable solvent, such as toluene, with acetyl sulfate as the sulfonating agent, such as described in U.S. Pat. No. 3,836,511, incorporated herein by reference. The resulting sulfonic acid derivative can then be neutralized with a number of different neutralization agents, such as sodium phenolate and similar metal salts. The amounts of such neutralization agents employed will normally be stoichiometrically add to the amount of free acid in the polymer, plus an unreacted reagent which is still present. It is preferred that the amount of neutralizing agent be equal to the molar amount of sulfonating agent originally employed plus 10 percent more to ensure full neutralization. The use of more of such neutralization agent is necessary to effect at least 50 percent neutralization of the sulfonic acid groups present in the polymer, preferably at least 90 percent, and most preferably essentially complete neutralization of such acid groups should be effected.

Thus, the degree of neutralization of said sulfonate groups may vary from 0 (free acid form) to greater than 100 mole percent, preferably 50 to 100 mole percent. With the utilization of neutralized sulfonates in this instant invention, it is preferred that the degree of neutralization be substantially complete, that is, with no substantial free acid present and without substantial excess of the base, other than that needed to ensure neutralization. The neutralization sulfonates possess greater thermal stability compared to their acid form. Thus, it is clear that the polymers which are normally utilized in the instant invention comprise substantially neutralized pendant groups and, in fact, an excess of the neutralizing material may be utilized without defeating the objects of the instant invention.

The sulfonated polymers of the instant invention may vary in number average molecular weight from 1,000 to 10,000,000, preferably 5,000 to 1,000,000, most preferably from 10,000 to 600,000. These polymers may be prepared by methods known in the art, for example, see U.S. Pat. No. 3,642,728, hereby incorporated by reference.

The preferred sulfonated polymers for use in the instant invention, e.g., sulfonated ethylene propylene terpolymers, sulfonated polystyrene and substituted derivatives thereof, may be prepared by the procedures described in U.S. Pat. No. 3,870,841, filed Oct. 2, 1972 in the names of H. S. Makowski, R. D. Lundberg and G. H. Singhal, hereby incorporated by reference.

The water insoluble base-containing copolymer will comprise from about 0.5 to 50 mole percent basic groups situated along the chain backbone or, alternatively, the basic groups content will range from about 4 meq. to about 500 meq. per 100 grams of polymer. The basic groups may be conveniently selected from primary, secondary and tertiary amine groups contained in polymerizable monomers. Included in these categories are pyridine, anilines, pyrroles, amides and other basic polymerizable ammonia derivatives. Specific polymers include styrene-4-vinylpyridine, styrene-2-vinylpyridine, t-Butyl styrene-4-vinylpyridine, ethylene-4-vinylpyridine copolymers, propylene-4-vinylpyridine copolymers, acrylonitrile-4-vinylpyridine, methyl methacrylate-4-vinyl pyridine copolymers, block copolymers and ethylene oxide/4-vinylpyridine, acrylic acid-4-vinylpyridine copolymers, ethylene-propylene-4-vinylpyridine terpolymers, isoprene-4-vinylpyridine, 4-vinyl pyridine-elasomers copolymers and the like. The preferred base-containing polymers of the instant invention are styrene and 4-vinylpyridine and ethylene-propylene terpolymers with grafted 4-vinylpyridine. The former polymers are the preferred species.

These materials are prepared through conventional solution, suspension and emulsion copolymerization techniques.

The sulfonated polymers of the instant invention may be neutralized prior to incorporation into the organic solvent, or by neutralization of the acid form in situ. For example, preferably the acid derivative is neutralized immediately after preparation. For example, if the sulfonation of polystyrene is conducted in solution, then the neutralization of that acid derivative can be conducted immediately following the sulfonation procedure. The neutralized polymer may then be isolated by means well known to those skilled in the art, i.e., coagulation, steam stripping or solvent evaporation, because the neutralized polymer has sufficient thermal stability to be dried for employment at a later time in the process of the instant invention. It is well known that the unneutralized sulfonic acid derivatives do not possess good thermal stability and the above operations avoid that problem.

It is also possible to neutralize the acid form of these polymers in situ; however, this is not a preferred operation since in situ neutralization requires preparation of the sulfonic acid in the organic liquid which is to be subjected to the instant process, or the acid form of the sulfonated polymer must be dissolved in said organic liquid. The latter approach may involve handling of an acid form of an ionic polymer which has limited thermal stability. Therefore, it is quite apparent that the preparation and isolation of a neutralized sulfonated polymer affords the maximum latitude in formulation, less problems in handling polymers of limited thermal stability and maximum control over the final mixture of sulfonated polymer, polar cosolvent and organic liquid.

The copolymer of styrene/vinyl pyridine is typically formed by the emulsion copolymerization of freshly distilled styrene and vinylpyridine monomers. This method of copolymerization is generally known to those well versed in the art. As noted previously, solution or suspension techniques may also be used to prepare those base-containing polymeric materials.

The interpolymer complex of the neutralized sulfonated polymer and the copolymer of styrene/vinyl pyridine is formed by forming a first solution of the neturalized sulfonated polymer in the previously described solvent system. A second solution of the copolymer of styrene/vinyl pyridine is formed by dissolving the copolymer of styrene/vinyl pyridine in an aromatic solvent, such as xylene or benzene. The concentration of the neutralized sulfonated polymer in the first solution is about 0.1 to about 20 weight percent, more preferably about 0.5 to about 10, and most preferably about 0.5 to about 6.0. The concentration of the copolymer of styrene/vinylpyridine in the second solution is about 0.1 to about 20 weight percent, more preferably about 0.5 to about 10 and most preferably about 0.5 to about 6.0. The first solution of the neutralized sulfonated polymer and the second solution of the copolymer of styrene/vinylpyridine are mixed together, thereby permitting the interaction of the neutralized sulfonated polymer and the copolymer of styrene/vinylpyridine to form the water insoluble interpolymer complex. Alternatively, both polymers can be dissolved simultaneously in the same solvent system. The molar ratio of sulfonate groups in the neutralized sulfonated polymer to nitrogen in the copolymer of styrene/vinylpyridine in the interpolymer complex is about 0.1 to about 20, more preferably about 0.5 to about 10, and most preferably about 1 to about 5. The concentration of the interpolymer complex in the hydrocarbon organic liquid is about 0.1 to about 20 weight percent, more preferably about 0.1 to about 10, and most preferably about 0.5 to about 6.

We have surprisingly found that a very important factor in determining the strength of the interaction between the amine-containing polymer and the sulfonate-containing polymer is the nature of the counterion. There are, broadly speaking, three major classes of such counterions. The first class, which are less preferred, are those metals of Group IA and Group IIA, a which include Li, Na, K, etc., Be, Mg, Ca, etc. We have found that these species do not interact as strongly with amine groups as the more preferred species described below. Those metals are commonly defined as members of the transition elements (see chemical text: *Chemical Principles and Properties*, by M. J. Sienko and R. A. Plane, McGraw Hill Book Co., 1974, page 19). These metal cations are best exemplified by zinc and interact strongly with pyridine and similar amines. As a consequence, a zinc neutralized sulfonated polymer interacts much more strongly with a styrene/vinylpyridine copolymer than does a magnesium or sodium neutralized system. It is for this reason that the transition elements are preferred, with zinc, copper, iron, nickel and cobalt being especially preferred. We also include antimony and lead as suitable cations.

A third species which is preferred is the free acid of the sulfonated polymer, which will also interact with amine-containing polymers. In this latter case, it is clear that the interaction is a classic acid-base interaction, while with the transition metals a true coordination complex is created, which is due to the donation of the electron pair of the nitrogen element. This distinction is a very important one and sets these complexes apart from classic acid-base interactions. The surprising observation is that such coordination complexes can form in such extreme dilution insofar as interacting groups are concerned and that they are apparently formed so far removed from their expected stoichiometry (based on small molecule analogs).

As discussed above, a variety of polymer backbones will display the desirable properties discovered in this invention and are summarized as follows:

| Sulfonate Polymer | Amine Polymer |
| --- | --- |
| o Sulfo-EPDM | o Styrene/Vinylpyridine Copolymer |
| Sulfonate Isoprene Copolymers | Vinylpyridine/Styrene/Butadiene Terpolymers |
| Sulfonate SBR Polymers | |
| Sulfonate Butadiene Polymers | |
| Sulfonated Butyl | |
| Sulfonated Acrylate and Methacrylate Copolymers | Isoprene/Vinyl Pyridine Copolymer |
| Sulfonated Block Polymers | Ethylacrylate/Vinylpyridine Copolymer and Alkyl Acrylate Copolymers with Vinyl Pyridine where the Alkyl group varies in carbon number from 1 to 18 |
| | Methyl Methacrylate/Vinyl Pyridine Copolymer and Alkyl Methacrylate copolymers with Vinylpyridine wherein the number of carbon groups in the alkyl group varies from 1 to 18 carbon atoms |
| | Butadiene/Vinylpyridine Copolymer |
| | Propylene/Vinylpyridine Block Copolymer |
| | Ethylene/Vinylpyridine Block Copolymer |
| | t-Butyl Styrene/Vinylpyridine Copolymers |
| | Vinylpyridine Copolymers with alpha-beta ethylenically unsaturated copolymers or terpolymers |

The amount of vinylpyridine in the amine-containing polymer can vary widely, but should range from less than 50 mole percent down to at least 0.5 mole percent.

Preferably, the amine content in the basic polymer is expressed in terms of basic nitrogen. In this respect, the nitrogen content is amides and similar non-basic nitrogen functionality is not part of the interacting species.

A minimum of three basic groups must be present on the average per polymer molecule and the basic nitrogen content generally will range from 4 meq. per 100 grams of polymer up to 500 meq. per 100 grams. A range of 8 to 200 meq. per 100 grams is preferred.

The organic liquids which may be utilized in the instant invention are selected with relation to the ionic polymer and vice-versa. The organic liquid is selected from the group consisting of aromatic hydrocarbons, aliphatic hydrocarbons, cyclic aliphatic ethers, aliphatic ethers or organic aliphatic esters and mixtures thereof.

Specific examples of organic liquids to be employed with the various types of polymers are:

| Polymer | Organic Liquid |
| --- | --- |
| sulfonated polystyrene | benzene, toluene, ethyl benzene, methylethyl ketone, xylene, styrene, ethylendichloride, methylene chloride. |
| sulfonated poly-t-butyl-styrene | benzene, toluene, xylene, ethyl benzene, styrene, t-butyl styrene, aliphatic oils, aromatic oils, hexane, heptane, decane, nonane. |
| sulfonated ethylene-propylene terpolymer | pentane, aliphatic and aromatic solvent oils, such as Solvent "100 Neutral", "150 Neutral" and similar oils, benzene, diesel oil, toluene, xylene, ethyl benzene, pentane, hexane, heptane, octane, isooctane, nonane decane aromatic solvents, ketone solvents. |
| sulfonated styrene-methyl methacrylate copolymer | dioxane, halogenated aliphatics, e.g., methylene chloride, tetrahydrofuran. |
| sulfonated polyisobutylene | saturated aliphatic hydrocarbons, diisobutylene, triisobutylene, aromatic and alkyl substituted aromatic hydrocarbons, chlorinated hydrocarbons, n-butyl ether, n-amyl ether, methyl oleate, aliphatic oils, oils predominantly paraffinic in nature and mixtures containing naphthenic hydrocarbons. "Solvent 100 Neutral", "Solvent 150 Neutral" and all related oils, low molecular weight polymeric oils such as |

| Polymer | Organic Liquid |
| --- | --- |
| | squalene, white oils and process oils having 60 percent or less aromatic content. |
| sulfonated polyvinyl toluene | toluene, benzene, xylene, cyclohexane, ethyl benzene, styrene, methylene chloride, ethylene dichloride. |

In order to reduce the viscosity of organic hydrocarbon solution of the interpolymer complex to be able to employ the organic hydrocarbon solution in a casting process, a polar cosolvent may be added to the organic hydrocarbon solution of the interpolymer complex to solubilize the pendant ionomeric groups. The polar cosolvent will have a solubility parameter of at least 10.0, more preferably at least 11.0, and is water miscible and may comprise from 0.01 to 15.0 weight percent, preferably 0.1 to 5.0 weight percent, of the total mixture of organic liquid, water insoluble ionomeric polymer and polar cosolvent.

Normally, the polar cosolvent will be a liquid at room temperature, however, this is not a requirement. It is preferred, but not required, that the polar cosolvent be soluble or miscible with the organic liquid at the levels employed in this invention. The polar cosolvent is selected from the group consisting essentially of water soluble alcohols, amines, di- or tri-functional alcohols, amides, acetamides, phosphates, or lactones and mixtures thereof. Especially preferred polar cosolvents are aliphatic alcohols, such as methanol, ethanol, n-propanol, isopropanol, 1,2-propane diol, monoethyl ether of ethylene glycol and n-ethylformamide.

The elastomeric coatings of the instant invention are formed by applying the organic solution of the interpolymer complex over the substrate at an ambient temperature or at 10°-50° C., by either dip-coating or spray-coating or with the use of other techniques for thin spreading (such as brushing). The organic solvent system is then permitted to evaporate with or without the aid of forced drying gas, such as air or nitrogen gas. This step is called the drying process. The drying gas temperature can be from ambient temperature up to the boiling point of the organic solvent system. Preferably the temperature of the drying gas is between 20° C. to 100° C. The most preferred temperature of the drying gas should be about 70° C. for fast evaporation of the organic solvent system. After drying the thickness of the applied coating should be about 1 micrometer to about 100 micrometers. Most preferred, the coating thickness should be about 2 to about 20 micrometers for both performance and economic reasons. To control the thickness of the applied coating, the solution concentration of the interpolymeric complex is applied at 0.5 to 6 weight percent. Most preferably, the concentration should be about 5 weight percent. The coating solution of the interpolymeric complex can be applied in single or multiple layers, depending on the desired coating thickness. In any instance, the organic solvent system is evaporated after each layer application. The interpolymeric complex coating can be applied over the substrate of interest or over a previous coating. In the latter case, such practice can modify or improve the performance of the coated system.

The interpolymeric complex coating can be used as a barrier or controlled release coating for applications such as fertilizer, micronutrients or other solid materials.

DETAILED DESCRIPTION OF THE PREFERRED EMBODIMENT

The following Examples will demonstrate the performance of an interpolymer complex consisting of a sulfonate polystyrene and a styrene-4-vinylpyridine.

EXAMPLE 1

Preparation of Sulfonated EPDM

A sulfonated EPDM terpolymer (TP320) is prepared by sulfonating a 40 Mooney viscosity at 100° C. EPDM termpolymer (Royalene 521-Uniroyal) which has about 50 weight percent ethylene, about 5 weight percent ENB, with acetyl sulfate and neutralizing with $Zn(Ac)_2$ according to the procedure of U.S. Pat. No. 3,836,511, herein incorporated by reference, thereby producing 25 meq. of zinc sulfonate groups per 100 grams of the EPDM polymer.

EXAMPLE 2

Preparation of Styrene-4-Vinyl Pyridine Copolymer

A copolymer of styrene-4-vinyl pyridine was prepared via a free radical emulsion copolymerization process. The preparation was conducted as follows:

In a suitable, stirred reaction vessel under a nitrogen blanket the following ingredients were charged:
120 ml. distilled water
50 g. styrene
3.2 g. sodium lauryl sulfate
0.1 g. dodecylthiol
0.2 g. potassium persulfate
4.7 g. 4-vinyl pyridine The polymerization was conducted at 50° C. for 24 hours and the resultant emulsion was fluid and uniform. Three ml. of methanol containing 0.1% of hydroquinone was added as an inhibitor and the reaction mixture was precipitated in a large excess of acetone. The precipitate was filtered, then suspended in methanol and blended in a Waring blender to finally disperse the coagulated polymer. The suspension was filtered and dryed in a vacuum oven at 60° C. for 24 hours.

The resulting product represented 80% conversion of the reactive monomers and contained 1.68% nitrogen corresponding to 12.5 mole percent 4-vinyl pyridine incorporation.

EXAMPLE 3

Improved Barrier Properties of an Interpolymer Complex Coating

A solution of an interpolymer complex, solution A, was prepared for application as a coating solution. The solution cast coating was applied over urea samples in order to measure the barrier properties for urea extraction by water through the thin film coating.

Solution A was prepared by mixing, with a magnetic bar stirrer for at least 1 hour, a given weight ratio of solution B and solution C which ranges between 2/1 and 9/1, respectively, of B/C. Solution B consisted of 2.5 grams of a zinc sulfo-EPDM similar to the one described in Example 1 (Uniroyal Ionic Elastomer 2560), containing 25 meq. of sulfonate groups per 100 grams of ethylene propylene ethylidene-norbornene terpolymer neutralized with zinc; in 100 grams of solvent D. Solution C consisted of 2.5 grams of emulsion copolymerized styrene vinyl pyridine, similar to the one described in Example 2, (SVP-703) containing about 8 mole percent vinylpyridine and having an intrinsic viscosity in xylene at 25° C. of about 2.6, in 100 grams of solvent D. Solvent D consisted of 97.5% toluene and 2.5% methanol reagent. Solutions B and C were also prepared by mixing with a magnetic bar stirrer at room temperature until all the polymer was visually dissolved.

To determine the barrier properties of films formed from solution A, urea slides were coated for immersion tests. The procedures for preparing coated samples of urea slides and conducting immersion tests are described as follows:

Urea samples were prepared by depositing reagent grade urea (Fisher Scientific) over microscope glass slides. This was done by dipping glass slides into molten urea at a temperature of about 135°-145° C., followed by cooling and solidification of the urea layer. The urea layer was built up to about 7 mm. by 4 to 5 succesive dipping and cooling cycles. These urea samples were then coated by a polymeric film using a second dipping procedure. Urea slides were repeatedly dipped into polymeric solutions, such as those described above, followed by drying in a vacuum oven at 70° C. for about 3 hours. The dripping and drying cycles were repeated until the film thicknesses shown in Table I were obtained.

The barrier properties of the various polymeric films were determined by immersion of each coated urea slide in about 100 g. of deionized water at room temperature. The amount of urea released into the water was determined by recovering the urea after evaporating the water. Each sample was initially immersed for 1 day, followed by immersion in fresh water for 3 days and for weekly intervals thereafter.

Table I shows the permeabilities of urea solution extracted from the coated urea slides and immersed in water at room temperature. The permeabilities of the coating materials were determined by applying Fick's law of diffusion at steady state. Fick's law states that:

$$J_m = DA(\Delta C\delta)$$

where $J_m$ = mass flux (loss) through the film or membrane, A = transport area, $\Delta C$ = concentration gradient, $\delta$ = film or membrane thickness and D = membrane diffusivity constant which is equal to the ratio of permeability (P) over the solubility ratio (K) of urea in the membrane and in water.

The performance of the zinc-sulfo-EPDM/styrene-vinylpyridine (ZSE-SVP) film was compared with that of ZSE alone and that formed from solutions of two commercial coating materials. The first commercial coating solution was a tung oil solution made by Formby of Mississippi at 30 weight percent solids in petroleum distillate. The second commercial coating solution was linseed oil modified polyurethane Type I made by Minwax Paint Co. of NJ at 45% solids in petroleum distillate. The ZSE film was also prepared using solvent D, as described above. The two commercial coatings were cured at 70° C. for 48 hours after coating.

The permeability of urea solution through the ZSE-SVP film was found to be about 4 order of magnitude lower than either that of tung oil or that of polyurethane, and it is 2-8 times lower than that of ZSE film alone. Note that tung oil and polyurethane were claimed as release control coatings for water soluble fertilizers (U.S. Pat. Nos. 3,321,298 and 3,223,518).

This Example shows that thin films of ZSE-SVP interpolymer complex provide a much better barrier than do commercial materials. Moreover, the Example shows an unexpected synergistic result in barrier properties for ZSE-SVP films at a level of about 90/10 ZSE-SVP when compared to the barrier properties of ZSE films alone.

TABLE I

PERMEABILITY OF UREA SOLUTION FROM COATED UREA SLIDES IN WATER AT ROOM TEMPERATURE

| Sample No. | Coating Material | Ratio wt/wt | Film Thickness Microns | Permeability (P = DK) $cm^2$/sec |
|---|---|---|---|---|
| 141-3 | Tung Oil | — | 75 | $4.3 \times 10^{-9}$ |
| 141-6 | Tung Oil | — | 125 | $7.6 \times 10^{-9}$ |
| 158-4 | Polyurethane | — | 100 | $1.3 \times 10^{-9}$ |
| 158-5 | Polyurethane | — | 40 | $2.1 \times 10^{-9}$ |
| 28-14 | ZSE | — | 10 | $9.6 \times 10^{-13}$ |
| 84-1 | ZSE | — | 25 | $8.6 \times 10^{-13}$ |
| 84-2 | ZSE | — | 30 | $8.6 \times 10^{-13}$ |
| 84-5 | ZSE-SVP | 90/10 | 25 | $1.1 \times 10^{-13}$ |
| 84-6 | ZSE-SVP | 90/10 | 20 | $1.8 \times 10^{-13}$ |
| 127-B10 | ZSE-SVP | 66.6/33.4 | 15 | $2.5 \times 10^{-13}$ |
| 127-C9 | ZSE-SVP | 66.6/33.4 | 15 | $4.0 \times 10^{-13}$ |

EXAMPLE 4

Mechanical Properties

The polymeric ingredients used in Example 3 were melt mixed to obtain samples for mechanical properties testing. In addition to the zinc-sulfo-EPDM (ZSE) material used in Example 3 an additional ZSE of a lower sulfonation level (about 10 meq. per 100 grams) was also used.

Melt mixing was conducted in a 60 ml Brabender intensive mixer which was preheated to 150° C. The ZSE to SVP ratio was varied but zinc stearate was added to all the mixes at a level of 4 parts per hundred of rubber (phr) (based on ZSE). The zinc stearate which is an ionic plasticizer is assumed to be incorporated in the ZSE phase. ZSE material described in Example 3 incorporating 4 parts per hundred of zinc stearate is shown in this Example as ZSE-25 and the second ZSE material incorporaing 4 phr/zinc stearate is shown as ZSE-10.

The melt mixing was carried out at 60-80 rpm and for a period of 10 minutes after all the ingredients were added to the mixer. Samples were compression molded at a thickness of about 0.035 inches for stress-strain measurements and at about 0.125 inches for hardness measurements. Stress-strain was measured on micro-dumbbells at 2 inches/minute. Hardness measurements were done with Shore A and Shore D hardness testers. Properties measured at room temperature are given in Table II.

This Example shows that mechanical properties can be easily adjusted for an inter-polymer complex by either varying the component ratio or the structure of one or of both components. The possible adjustability of properties is important in optimizing coating properties for a given use.

TABLE II

MECHANICAL PROPERTIES OF ZSE/SVP BLENDS

| Material | Ratio wt/wt | Youngs Mod. psi | 100% Mod. psi | Elong. % | Tensile psi | Shore Hardness A | Shore Hardness D |
|---|---|---|---|---|---|---|---|
| ZSE-25 | 100/0 | 250 | 224 | 660 | 3,341 | 65 | 20 |
| ZSE-25/SVP | 90/10 | 580 | 367 | 603 | 2,969 | 75 | 25 |
| ZSE-25/SVP | 66.3/33.4 | 5,200 | 1,170 | 512 | 3,712 | 91 | 40 |
| ZSE-10/SVP | 66.3/33.4 | 1,180 | 429 | 319 | 587 | 76 | 24 |
| ZSE-25/SVP | 50/50 | 26,000 | 2,112 | 405 | 4,080 | 96 | 57 |

What is claimed is:

1. A composite comprising:
   (a) a substrate; and
   (b) a polymeric, elastomeric coating having a Shore Hardness A of at least 75 which is adhered to at least one surface of said substrate, said polymeric, elastomeric coating having a thickness of about 1 to about 100 micrometers, wherein said polymeric coating comprises an interpolymeric complex of a neutralized sulfonated polymer and an amine containing polymer, said neutralized sulfonated polymer having a sulfonate content of about 4 to about 200 meq. per 100 grams of said neutralized sulfonated polymer and said amine containing polymer containing basic nitrogen atoms wherein the basic nitrogen content ranges from about 4 to about 50 meq. per 100 grams of polymer.

2. A composite according to claim 1 wherein said sulfonate groups are neutralized with an ammonium or metal counterion.

3. A composite according to claim 2 wherein said metal counterion is selected from the group of transition elements.

4. A composite according to claim 3 wherein said sulfonate groups are at least 90 mole percent neutralized.

5. A composite according to claim 2 wherein said neutralized sulfonated polymer is formed from an elastomeric polymer.

6. A composite according to claim 5 wherein said elastomeric polymer is selected from the group including EPDM terpolymer or Butyl rubber.

7. A composite according to claim 1 wherein said amine-containing polymer is a copolymer of styrene/vinylpyridine.

8. A composite according to claim 7 wherein the copolymer is styrene-4-vinylpyridine having about 0.5 to 50 mole percent 4-vinylpyridine units.

9. A composite according to claim 1, wherein said amine-containing polymer is selected from the group containing primary, secondary and tertiary amine units.

10. A composite according to claim 1 wherein said substrate is a fertilizer.

11. A composite according to claim 1 wherein said substrate is urea.

12. A composite according to claim 1 wherein said substrate is a micronutrient.

* * * * *